Figure 2:
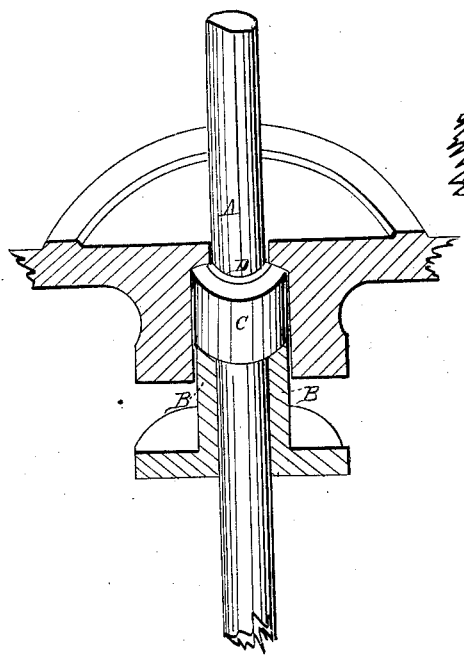

P. Clark,
Piston Packing.

№ 17,422. Patented June 2, 1857.

UNITED STATES PATENT OFFICE.

PATRICK CLARK, OF RAHWAY, NEW JERSEY.

PACKING PISTONS AND STUFFING-BOXES OF STEAM-ENGINES.

Specification of Letters Patent No. 17,422, dated June 2, 1857.

*To all whom it may concern:*

Be it known that I, PATRICK CLARK, of Rahway, in the county of Essex and State of New Jersey, have invented a new and improved method of packing piston, valve, pump, and other rods of steam-engines, where said rods protrude through that part of such machines usually called "stuffing-boxes;" and I do hereby declare that the following is a full and exact description thereof, reference being had to the accompanying drawings and the letters of reference marked thereon.

The nature of my invention consists in surrounding the rod to be packed with several thicknesses of metal foil or thin shavings as a wearing surface against the rod in such a manner that the whole mass becomes under the pressure of the hemp or other packing surrounding it a plastic mass of metal capable of being continually compressed to the rod until it is all worn out.

To enable others skilled in the art of packing the piston, valve, pump, and other rods of steam engines to use my improved method of packing, I shall proceed to describe it in the following specification and the drawing annexed thereto, in which—

Figure 1:
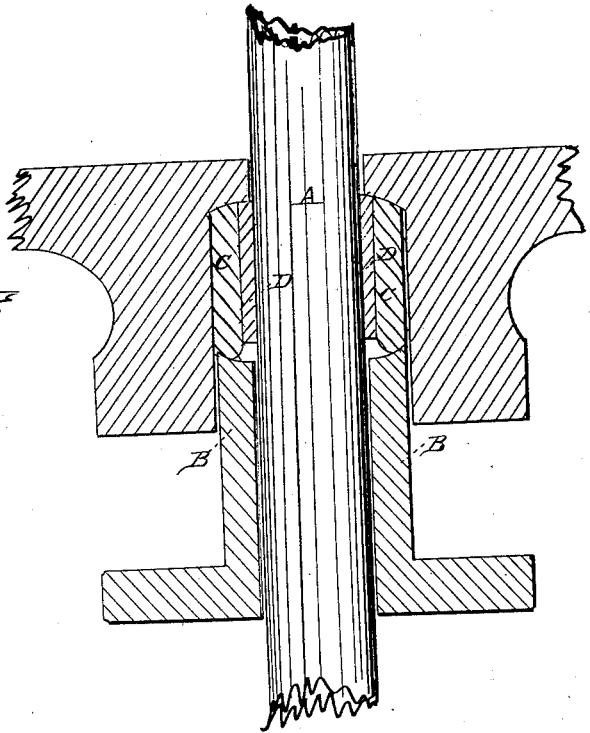

Figure 1, is a sectional view of a valve or piston rod through its length. Fig. 2, is a perspective view of the packing, with part of the stuffing box removed. The red color shows the position of the metallic foil; the dark color next to it, shows the relative position of the elastic material.

The same letters also refer to the same parts in both drawings.

A, A, Figs. 1 and 2, represents a rod in a stuffing box—B, B, the gland used for pressing the packing to make it tight—C, C, the elastic material (vulcanized rubber answers excellently well for the purpose); and D, D, is the metal foil in red next the rod.

The method of packing is as follows: Remove the gland B, B, from the stuffing box in the usual way, then take a strip of metal foil (I find by experience that tinfoil answers very well), say, four feet long, or sufficient to make, when wound around the rod, say, thirty thicknesses of the foil. Wind around the outside of the foil sufficient rubber or hemp to make the whole equal to the interior diameter of the stuffing box, then shove all together into the stuffing box, and screw the gland in after, until sufficiently steam or water tight, as the case may be.

Piston rods, when packed according to the above described method will not require packing again in three months, even under steam pressure of one hundred (100) pounds to the square inch.

What I claim as my invention, and desire to secure by Letters Patent, is—

The foil or plastic sheet metal packing as herein set forth.

PATRICK CLARK.

Witnesses:
  WM. GIBBY,
  W. I. GIBBY.